(12) United States Patent
Sherman et al.

(10) Patent No.: US 8,202,934 B2
(45) Date of Patent: Jun. 19, 2012

(54) HOT MELT PROCESSABLE POLYUREA COPOLYMERS AND METHODS OF THEIR PREPARATION AND USE

(75) Inventors: Audrey A. Sherman, St. Paul, MN (US); Craig E. Hamer, Woodbury, MN (US); Donald H. Lucast, North St. Paul, MN (US); Thomas E. Augustine, Hager City, WI (US); Wendi J. Winkler, Minneaplolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/830,943

(22) Filed: Jul. 31, 2007

(65) Prior Publication Data

US 2009/0036598 A1 Feb. 5, 2009

(51) Int. Cl.
*C08G 18/08* (2006.01)
*C08L 75/00* (2006.01)
*B65B 29/00* (2006.01)
*B29C 53/82* (2006.01)
*B29C 65/00* (2006.01)

(52) U.S. Cl. ............ 524/589; 53/401; 156/155
(58) Field of Classification Search .......... 524/589; 53/401; 156/155
See application file for complete search history.

(56) References Cited

U.S. PATENT DOCUMENTS

| | | | |
|---|---|---|---|
| 2,676,182 A | 4/1954 | Daudt et al. | |
| 3,627,851 A | 12/1971 | Brady | |
| 3,772,247 A | 11/1973 | Flannigan | |
| 3,890,269 A | 6/1975 | Martin | |
| 4,598,004 A | 7/1986 | Heinecke | |
| 4,661,577 A | 4/1987 | Jo Lane et al. | |
| 4,810,523 A * | 3/1989 | Williams et al. | 427/505 |
| 4,935,484 A | 6/1990 | Wolfgruber et al. | |
| 5,026,890 A | 6/1991 | Webb et al. | |
| 5,214,119 A | 5/1993 | Leir et al. | |
| 5,248,706 A | 9/1993 | Panster et al. | |
| 5,257,491 A * | 11/1993 | Rouyer et al. | 53/428 |
| 5,276,122 A | 1/1994 | Aoki et al. | |
| 5,302,685 A | 4/1994 | Tsumura et al. | |
| 5,319,040 A | 6/1994 | Wengrovius | |
| 5,373,682 A * | 12/1994 | Hatfield et al. | 53/440 |
| 5,387,623 A * | 2/1995 | Ryan et al. | 523/124 |
| 5,461,134 A | 10/1995 | Leir et al. | |
| 5,512,650 A | 4/1996 | Leir et al. | |
| 5,804,610 A * | 9/1998 | Hamer et al. | 522/182 |
| 5,932,298 A * | 8/1999 | Moon | 427/496 |
| 6,294,249 B1* | 9/2001 | Hamer et al. | 428/345 |
| 6,355,759 B1 | 3/2002 | Sherman et al. | |
| 6,730,397 B2* | 5/2004 | Melancon et al. | 428/355 R |
| 2002/0013442 A1* | 1/2002 | Sherman et al. | 528/28 |
| 2003/0152768 A1* | 8/2003 | Melancon et al. | 428/355 R |
| 2003/0175510 A1* | 9/2003 | Sherman et al. | 428/355 R |
| 2005/0136266 A1* | 6/2005 | Zhou et al. | 428/447 |
| 2005/0282024 A1* | 12/2005 | Sherman et al. | 428/447 |
| 2006/0093764 A1* | 5/2006 | Mehta et al. | 428/35.2 |

FOREIGN PATENT DOCUMENTS

WO WO 97/33945 9/1997

OTHER PUBLICATIONS

John Wiley & Sons, Encyclopedia of Polymer Science and Engineering. vol. 15, pp. 265-270, 1989.

* cited by examiner

*Primary Examiner* — Mark Eashoo
*Assistant Examiner* — Liam Heincer
(74) *Attorney, Agent, or Firm* — Thomas M. Spielbauer

(57) ABSTRACT

Packaged viscoelastic compositions comprising viscoelastic copolymers and a packaging material are disclosed. The viscoelastic copolymers are urea copolymers, which are the reaction product of polyisocyanates and polyamines. The packaged viscoelastic compositions are hot melt processable.

32 Claims, No Drawings

HOT MELT PROCESSABLE POLYUREA COPOLYMERS AND METHODS OF THEIR PREPARATION AND USE

TECHNICAL FIELD

Viscoelastic polyurea copolymers, packaged viscoelastic polyurea copolymers and methods of making and using the copolymers are described.

BACKGROUND

Viscoelastic polyurea copolymers are a class of polymeric materials that have found a wide variety of uses, including uses such as coatings (including release coatings), adhesives (including pressure sensitive adhesives), gaskets, tubing, vibration dampening materials and the like.

Many of these viscoelastic polyurea copolymers are polydiorganosiloxane-based copolymers. The unique properties of these copolymers are derived mainly from the physical and chemical characteristics of the siloxane bond and the organic substituents. Typically the outstanding properties of polydiorganosiloxane copolymers include resistance to ultraviolet light, extremely low glass transition temperature, good thermal and oxidative stability, high permeability to many gases, very low surface energy, low index of refraction, good hydrophobicity and good dielectric properties.

Traditionally viscoelastic polyurea copolymers have been prepared in solution. The dissolved copolymer is then cast or coated and dried.

SUMMARY

Viscoelastic polyurea compositions, packaged viscoelastic polyurea compositions, methods of making them as well as methods of using them as, for example, hot melt processable pressure sensitive adhesives are provided. For environmental reasons as well as convenience, copolymeric materials that can be prepared by solventless methods and can be hot melt processed are desirable. Packaged viscoelastic compositions are easily and conveniently handled and transported. Hot melt processable viscoelastic compositions provide for more environmentally friendly coating processes, because the need for solvent is eliminated.

In some embodiments, the packaged viscoelastic compositions comprise at least one viscoelastic copolymer which is the reaction product of at least one polyisocyanate and at least one polyamine, and a packaging material.

Also disclosed is a method of forming a viscoelastic composition comprising combining a pre-viscoelastic reactive mixture and a packaging material to form a packaged pre-viscoelastic composition, and reacting the pre-viscoelastic composition to form a packaged viscoelastic composition. The pre-viscoelastic reactive mixture comprises at least one polyisocyanate and at least one polyamine.

Some embodiments of this disclosure include a method of forming coated adhesive articles comprising preparing a packaged hot melt processable adhesive composition, melting the packaged hot melt processable adhesive composition, coating the hot melt processable adhesive composition onto a substrate. The packaged hot melt processable adhesive composition comprises the reaction product of at least one polyisocyanate and at least one polyamine. Among the coated adhesive articles which may be prepared this way are tapes, in which the substrate is a tape backing.

Also disclosed is an adhesive composition comprising a polyurea viscoelastic copolymer, a packaging material dispersed within the polyurea viscoelastic copolymer, tackifying resin, and a silicone oil.

DETAILED DESCRIPTION

Viscoelastic polyurea compositions, packaged viscoelastic polyurea compositions, methods of making packaged viscoelastic polyurea compositions, as well as methods of using them as for example hot melt processable pressure sensitive adhesives are provided.

The terms "a", "an", and "the" are used interchangeably with "at least one" to mean one or more of the elements being described.

The term "organic-based radical" refers to alkylene, heteroalkylene, arylene, aralkylene, or alkylene-aralkylene radicals or mixtures thereof.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof In some embodiments, the arylene group has up to 5 rings, up to 4 rings, up to 3 rings, up to 2 rings, or one aromatic ring. For example, the arylene group can be phenylene.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyoxyalkylenes where the heteroatom is oxygen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

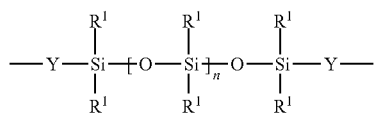

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof, and subscript n is an integer of 0 to about 1500.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being chemically transformed, degraded or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

In general, the viscoelastic polyurea copolymers have Formula (I):

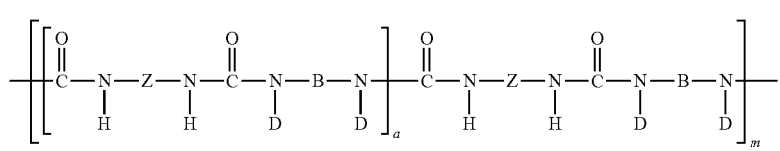

wherein:
each B is independently a polyvalent radical;
each D is independently selected from the group consisting of hydrogen, an alkyl group, a cycloalkyl group, a phenyl group, a group that completes a ring structure that includes B to form a heterocycle, and mixtures thereof,
each Z is independently a polyvalent radical;
each B' is independently a polyvalent organic-based radical;
m is an integer greater than zero; and
a is zero or an integer greater than zero.

In some embodiments B is a polydiorganosiloxane-based radical as shown in Formula (II):

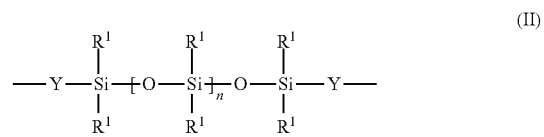

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof, and subscript n is an integer of 0 to about 1500. Each B', if present, is independently an organic-based radical. For example, B' can be an arylene (e.g., phenylene), aralkylene, alkylene, cycloalkylene, polyoxyalkylene (e.g., polyoxyethylene, polyoxypropylene, and polyoxytetramethylene), or mixtures thereof.

In other embodiments B is an organic-based radical selected from the group consisting of alkylene, arylene, aralkylene, cycloalkylene, phenylene, polyoxyalkylene, including for example, polyoxyethylene, polyoxypropylene, polyoxytetramethylene, and copolymers and mixtures thereof. Each B', if present, is also an organic-based radical.

The viscoelastic polyurea copolymers are derivable by reacting at least one polyamine with at least one polyisocyanate. The isocyanate groups react with amine groups to form urea bonds. This reaction is typically very facile and therefore typically does not require a catalyst such as is frequently required in polyurethane systems. A wide variety of polyisocyanate and polyamine materials are suitable for the synthesis of these viscoelastic polyurea copolymers. These reactant materials are described in further detail below.

Packaged viscoelastic polyurea compositions are also provided. These packaged viscoelastic polyurea compositions include the viscoelastic polyurea copolymers described above substantially surrounded by a packaging material and may contain other additives.

The packaging material is made of a material that is melt-sealable and when combined with the viscoelastic polyurea copolymer composition does not substantially adversely affect the desired characteristics.

In one embodiment of the disclosure, the viscoelastic polyurea copolymer composition is substantially surrounded with the packaging material; in another embodiment of the disclosure, the viscoelastic polyurea copolymer composition is completely surrounded with the packaging material. In this embodiment, it is intended that the viscoelastic polyurea copolymer composition be completely surrounded by the packaging material, but random variations in production may produce occasional packaged viscoelastic polyurea copolymer compositions in which the viscoelastic polyurea copolymer composition is not completely surrounded with the packaging material.

The packaging material preferably melts at or below the processing temperature of the viscoelastic polyurea copolymer composition (in other words, the temperature at which the viscoelastic polyurea copolymer composition flows). The packaging material generally has a melting point of 200° C. or less, or 170° C. or less. In some embodiments the melting point ranges from 90° C. to 150° C. The packaging material may be a flexible thermoplastic polymeric film. The packaging material is generally selected from ethylene-vinyl acetate, ethylene-acrylic acid, polypropylene, polyethylene, polybutadiene, or ionomeric films. In certain embodiments, the packaging material is an ethylene-acrylic acid or ethylene-vinyl acetate film.

Films ranging in thickness from 0.01 mm to 0.25 mm may be used as the packaging material. The thicknesses typically range from 0.025 mm to 0.127 mm to obtain films that have good strength during processing while being thin enough to heat seal quickly and minimize the amount of film material used.

The packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the viscoelastic polyurea copolymer composition.

The amount of packaging material depends upon the type of material and the desired end properties. The amount of packaging material typically ranges from 0.5 percent to 20 percent of the total weight of the viscoelastic polyurea copolymer composition and the packaging material. Preferably, the packaging material is between 2 percent and 15 percent by weight, and more preferably between 3 percent and 5 percent.

In addition to the viscoelastic polyurea copolymer, the viscoelastic polyurea copolymer composition may also contain other additives as long as the additives do not adversely affect the desired properties of the viscoelastic polyurea copolymer composition. Examples of useful additives include tackifying resins; plasticizers; fluids, including both hydrocarbon and silicone fluids or oils; dyes and pigments; electrically and/or thermally conductive compounds; antioxidants; antimicrobial agents; and ultraviolet light stabilizers and absorbers, such as hindered amine light stabilizers (HALS). Other additives include, but are not limited to, adhesion promoters, fillers (e.g., fumed silica, carbon fibers, carbon black, glass beads, glass and ceramic bubbles, glass fibers, mineral fibers, clay particles, organic fibers such as nylon, metal particles, or unexpanded polymeric microspheres), tack enhancers, blowing agents, hydrocarbon plasticizers, and flame-retardants.

In some embodiments the packaged viscoelastic polyurea copolymer composition includes a polydiorganosiloxane polyurea copolymer, a packaging material, and an unreactive diluent.

Diluents typically have a number average molecular weight of at least about 150 g/mole or at least about 500 g/mole. The molecular weight of the diluent is generally less than 100,000 g/mole, or less than about 50,000 g/mole, and in some embodiments less than about 30,000 g/mole or less than about 20,000 g/mole. The molecular weight of the diluent may be measured or reported by the supplier (e.g. GE Silicones, Waterford, N.Y.). In some embodiments the molecular weight of the unreactive diluent is less than the molecular weight of the diamine employed to make the viscoelastic polyurea copolymer.

A particularly useful class of unreactive diluents are silicone oils. Representative silicone oils include but are not limited to trialkylsiloxy terminated polydimethylsiloxane, polyphenylmethylsiloxane, polydialkylsiloxane, as well as copolymers of such with trialkylsiloxy terminated species. A particularly useful silicone oil is the silicone fluid RHODORSIL 47V commercially available from Rhodia Silicones.

Other suitable diluents include for example hydrocarbon fluids, low molecular weight oligomers, alkanes, alkenes, acrylates, esters, and oils (e.g., aromatic oils, mineral oils, naphthenic oils). Various combinations of diluents can be used if desired.

The packaged viscoelastic polyurea copolymers are prepared by providing a reactive pre-viscoelastic mixture, substantially surrounding the reactive pre-viscoelastic mixture with a packaging material and allowing the pre-viscoelastic mixture to react.

In general the pre-viscoelastic mixture contains an isocyanate functional material, an amine functional material and may contain other reactive or unreactive materials. Typically the isocyanate functional material is a polyisocyanate as shown in Formula (III)

$$Z(NCO)_b \qquad (III)$$

and the amine functional material is a polyamine as shown in Formula (IV)

$$B(NDH)_b \qquad (IV)$$

where:
Z is an b-valent radical as defined above;
B is an b-valent radical as defined above;
each D is selected from the group consisting of hydrogen, an alkyl radical of 1 to 10 carbon atoms, phenyl, and a radical that completes a ring structure including B or Y to form a heterocycle; and
each b is 2 or greater.

In some embodiments Z is a hydrocarbon based radical that is an arylene radical or an aralkylene radical having from about 6 to 20 carbon atoms, an alkylene or cycloalkylene radical having from about 6 to 20 carbon atoms. In other embodiments the Z radical may contain heteroatoms or functional groups as long as they do not interfere with the isocyanate-amine reaction.

In some embodiments B is a polydiorganosiloxane-based radical as shown in Formula (II) where each $R^1$, Y and n are as defined above.

In other embodiments B is an organic-based radical selected from the group consisting of alkylene, arylene, aralkylene, cycloalkylene, phenylene, polyoxyalkylene, including for example, polyoxyethylene, polyoxypropylene, polyoxytetramethylene, and copolymers and mixtures thereof.

The viscoelastic polyurea copolymers are prepared by the reaction of polyisocyanate materials and polyamine materials. The isocyanate groups react with amine groups to form urea bonds. This reaction is typically very facile and therefore does not require a catalyst such as is frequently required in polyurethane systems. A wide variety of polyisocyanate and polyamine materials are suitable for the synthesis of these viscoelastic polyurea copolymers.

In some embodiments b in formula (III) is equal to 2 and the polyisocyanate is a diisocyanate of Formula (V)

$$OCN-Z-NCO \qquad (V)$$

where Z is as defined above. In some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof.

In some embodiments b in formula (IV) is equal to 2 and the polyamine is a diamine of Formula (VI)

$$HDN-B-NDH \qquad (VI)$$

where B and D are as defined above.

In some embodiments B is a polydiorganosiloxane-based radical as shown in Formula (II) and the diamine is a polydiorganosiloxane diamine. The polydiorganosiloxane diamine of Formula (VI) can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.). Some polydiorganosiloxane diamines are commercially available, for example, from Shin Etsu Silicones of America, Inc., Torrance, Calif. and from Gelest Inc., Morrisville, Pa.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

In other embodiments B in Formula (VI) is an organic-based radical and Formula (VI) is an organic diamine. Organic diamines include, for example, those selected from alkylene diamines, heteroalkylene diamines, arylene diamines, aralkylene diamines, or alkylene-aralkylene diamines.

Exemplary polyoxyalkylene diamines (i.e., heteroalkylene diamines with the heteroatom being oxygen) include, but are not limited to, those commercially available from Huntsman, The Woodlands, Tex. under the trade designation JEFFAMINE D-230 (i.e., polyoxypropylene diamine having an average molecular weight of about 230 g/mole), JEFFAMINE D-400 (i.e., polyoxypropylene diamine having an average molecular weight of about 400 g/mole), JEFFAMINE D-2000 (i.e., polyoxypropylene diamine having an average molecular weight of about 2,000 g/mole), JEFFAMINE HK-511 (i.e., polyetherdiamine with both oxyethylene and oxypropylene groups and having an average molecular weight of about 220 g/mole), JEFFAMINE ED-2003 (i.e., polyoxypropylene capped polyethylene glycol with an average molecular weight of about 2,000 g/mole), and JEFFAMINE EDR-148 (i.e., triethyleneglycol diamine).

Exemplary alkylene diamines include, but are not limited to, ethylene diamine, propylene diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethyl-cyclohexylamine.

Exemplary arylene diamines include, but are not limited to, m-phenylene diamine, o-phenylene diamine, and p-phenylene diamine. Exemplary aralkylene diamines include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

Additional ingredients, either reactive or unreactive, may be added to the pre-viscoelastic mixture. Examples of reactive additives include, for example, isocyanate-functional materials or amine functional materials. Examples of isocyanate-functional materials that may be added include isocyantes of Formula (III) where b is greater than 2 such as triisocyanates. Triisocyanates include, but are not limited to, polyfunctional isocyanates, such as those produced from biurets, isocyanurates, adducts and the like. Some commercially available polyisocyanates include portions of the DESMODUR and MONDUR series from Bayer; Pittsburgh, Pa. and the PAPI series of Dow Plastics; Midland, Mich. Preferred triisocyanates include those available from Bayer under the trade designations DESMODUR N-3300 and MONDUR 489.

Examples of amine-functional materials that may be added, include compounds of Formula (IV) where b is greater than 2 such as triamines and tetraamines. Useful triamines and tetraamines include alkyl polyamines such as triethylene tetraamine and diethylene triamine and polyoxyalkylene polyamines. Examples of suitable commercially available polyoxyalkylenepolyamines include various JEFFAMINES from Huntsman Chemical Company such as the T series triamines (e.g., T-403), as well as DCA-221 from Dixie Chemical Company. Additionally, diamines such as polydiorganosiloxane diamines and organic diamines may also be useful.

Examples of non-reactive additives include tackifying resins; plasticizers; unreactive diluents, including both hydrocarbon and silicone fluids or oils; dyes and pigments; electrically and/or thermally conductive compounds; antioxidants; antimicrobial agents; and ultraviolet light stabilizers and absorbers, such as hindered amine light stabilizers (HALS). Other additives include, but are not limited to, adhesion promoters, fillers (e.g., fumed silica, carbon fibers, carbon black, glass beads, glass and ceramic bubbles, glass fibers, mineral fibers, clay particles, organic fibers such as nylon, metal particles, or unexpanded polymeric microspheres), tack enhancers, blowing agents, hydrocarbon plasticizers, and flame-retardants.

Unreactive diluents are often useful additives to add to the pre-viscoelastic mixture since it is generally disadvantageous to add solvents, and diluents are useful in the reaction mixture to dissipate heat, to dilute the reactive compounds and provide mobility for the reactants. Particularly useful unreactive diluents are silicone oils. Representative silicone oils include but are not limited to trialkylsiloxy terminated polydimethylsiloxane, polyphenylmethylsoloxane, polydialkylsiloxane, as well as copolymers of such with trialkylsiloxy terminated species. A particularly useful silicone oil is the silicone fluid RHODORSIL 47V commercially available from Rhodia Silicones. Other suitable diluents include for example hydrocarbon fluids, low molecular weight oligomers, alkanes, alkenes, acrylates, esters, and oils (e.g., aromatic oils, mineral oils, naphthenic oils). Various combinations of diluents can be used if desired.

The components of the pre-viscoelastic mixture may be mixed by any convenient mixing techniques or apparatus such as are well known in the art. The components may be fed from separate streams into a single mixing stream through, for example, gear pumps or gravity feeding equipment. The mixing stream may be a pipe, a tube or other fluid channel and may contain mixing elements such as static mixing elements to aid the intimate mixing of the components.

The pre-viscoelastic mixture is substantially surrounded by a packaging material. Suitable packaging materials have been described above.

Several different techniques may be used to surround the pre-viscoelastic mixture by a packaging material. Some of these techniques are described in PCT Publication WO 97/33945.

In one embodiment, two lengths of thermoplastic film are heat sealed together across the bottom and on each of the lateral edges on a liquid form-fill-seal machine to form an open ended pouch. The pre-viscoelastic composition is pumped through a hose to fill the pouch, and the pouch is then heat sealed across the top to completely surround the adhesive composition.

Generally, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

For ease of handling, it is desirable to seal the pouches as soon as they are filled with the composition, although immediate sealing is not necessary in all cases. Because the reaction of the polyisocyanate and the polyamine typically occurs spontaneously it is generally desirable to seal the pouches quickly.

Alternatively, a single length of film can be folded lengthwise and sealed on one edge, filled with the pre-adhesive composition, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple pouches across and down the lengths of film. For example, in addition to the seals on the lateral edges, a seal can also be formed down the center of the lengths of film so that a cross seal will form two filled pouches. The pouches can either be left attached to each other by the cross-seals and/or vertical seals, or they can be cut into individual pouches or strands of pouches. The pouches may each contain the same or different compositions.

Once the pouches have been sealed they may be conveyed to a cooling zone to moderate the exotherm generated by the isocyanate/amine reaction. This cooling zone may have jets of air or water or may be a bath with water or other cooling liquid.

The reaction to form the packaged viscoelastic polyurea copolymer composition is typically very fast and generally is complete in one hour or less. In some embodiments the reaction is complete in 30 minutes or less or even 15 minutes or less. The completion of the reaction can be monitored by for example detection of the disappearance of a characteristic isocyanate peak in the infrared spectrum of the reaction mixture.

Upon completion of the reaction of the pre-viscoelastic mixture to form the packaged viscoelastic polyurea copolymer composition, the packaged viscoelastic polyurea copolymer composition may be immediately used to prepare viscoelastic articles, stored for later use or shipped to other locations.

The packaged viscoelastic polyurea copolymer compositions are useful for a variety of applications. The self-contained nature of the package permits easy handling, storage, transportation and processing of the compositions.

The packaged viscoelastic polyurea copolymer compositions are hot melt processable. While the compositions are hot melt processable they may be processed in other ways, for example, using solvents. The packaged viscoelastic polyurea copolymer compositions may be dissolved or suspended in any solvent which can dissolve the packaging material or the packages may be unsealed and the viscoelastic polyurea copolymer compositions removed from the packaging material with a solvent.

Hot melt processing is a processing operation particularly well suited to the packaged viscoelastic polyurea copolymer compositions. In hot melt processing, the packaged viscoelastic polyurea copolymer composition, alone or together with other additives, is melt mixed to give a substantially homogeneous distribution of the components. Typically this is done by melt mixing the components in a molten or softened state using devices that provide dispersive mixing, distributive mixing, or a combination thereof. Both batch and continuous methods of mixing may be used. Examples of batch methods include internal mixing and roll milling. Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements.

In one embodiment the hot melt processable viscoelastic polyurea copolymer composition is an adhesive. In some embodiments the adhesive is a pressure sensitive adhesive. Pressure sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power.

Typically the pressure sensitive adhesives prepared from the packaged viscoelastic polyurea copolymers contain tackifying resins. The nature, composition and amount of tackifying resin used depends upon the nature and composition of the viscoelastic polyurea copolymer. For example if the viscoelastic polyurea copolymer contains polydiorganosiloxane groups the tackifying resin is typically a silicate type of tackifying resin. If however the viscoelastic polyurea copolymer is free of polydiorganosiloxane groups a hydrocarbon type of tackifying resin may be used. Mixtures of tackifying resins may also be used in some instances.

Silicate tackifying resins are added to polydiorganosiloxane polyurea copolymer compositions to provide or enhance the adhesive properties of the copolymer. The silicate tackifying resin can influence the physical properties of the resulting adhesive composition. For example, as silicate tackifying resin content is increased, the glassy to rubbery transition of the adhesive composition occurs at increasingly higher temperatures. In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof Typical exemplary silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R' groups.

MQ silicate tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicate tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicate tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2=CH-$) groups ("$D^{Vi}$" units).

MQT silicate tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable silicate tackifying resins are commercially available from sources such as Dow Corning, Midland, Mich., General Electric Silicones Waterford, N.Y. and Rhodia Silicones, Rock Hill, S.C. Examples of particularly useful MQ silicate tackifying resins include those available under the trade designations SR-545 and SR-1000, both of which are commercially available from GE Silicones, Waterford, N.Y. Such resins are generally supplied in organic solvent and may be employed in the formulations of the adhesives of the present disclosure as received. Blends of two or more silicate resins can be included in the adhesive compositions.

The adhesive compositions typically contain 20 to 80 weight percent polydiorganosiloxane polyurea and 20 to 80 weight percent silicate tackifying resin based on the combined weight of polydiorganosiloxane polyurea and silicate tackifying resin. For example, the adhesive compositions can contain 30 to 70 weight percent polydiorganosiloxane polyoxamide and 30 to 70 weight percent silicate tackifying resin, 35 to 65 weight percent polydiorganosiloxane polyoxamide and 35 to 65 weight percent silicate tackifying resin, 40 to 60 weight percent polydiorganosiloxane polyurea and 40 to 60 weight percent silicate tackifying resin, or 45 to 55 weight percent polydiorganosiloxane polyoxamide and 45 to 55 weight percent silicate tackifying resin.

A wide variety of non-silicate tackifier chemistries may be used in conjunction with or instead of silicate resins when the polyurea copolymer is free of or relatively free of polydiorganosiloxane groups. One class of tackifying resins particularly useful are terpene phenolics, and the like. Terpene phenolic-based tackifiers are commercially available from Arizona Chemical; Panama City, Fla., under the trade designation NIREZ. When used, tackifiers are added in amounts sufficient to attain the desired adhesive properties. For example, tackifiers may be used to render the viscoelastic polyurea copolymer pressure sensitive. Typically, the amount of tackifier used is about 80 parts per hundred or less, based on weight of the polyurea copolymer. More typically, the amount of tackifier used is about 65 parts per hundred or less, or even about 45 parts per hundred or less, based on weight of the polyurea copolymer.

As described above, the tackifying resin if used may be added to the pre-viscoelastic mixture prior to be surrounding by the packaging material. Additionally the tackifying resin or resins may be added to the packaged viscoelastic polyurea copolymer composition during hot melt processing.

Additional additives may also be added during hot melt processing as long as the additives do not adversely affect the desired properties of the pressure sensitive adhesive. Examples of useful additives include plasticizers; unreactive diluents, including both hydrocarbon and silicone fluids or oils as described above; dyes and pigments; electrically and/or thermally conductive compounds; antioxidants; antimicrobial agents; and ultraviolet light stabilizers and absorbers, such as hindered amine light stabilizers (HALS). Other additives include, but are not limited to, adhesion promoters, fillers (e.g., fumed silica, carbon fibers, carbon black, glass beads, glass and ceramic bubbles, glass fibers, mineral fibers, clay particles, organic fibers such as nylon, metal particles, or unexpanded polymeric microspheres), tack enhancers, blowing agents, hydrocarbon plasticizers, and flame-retardants.

The pressure sensitive adhesives prepared from the packaged viscoelastic polyurea copolymers may be applied to a substrate to form adhesive articles. For example, the adhesive can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., polypropylene (e.g., biaxially oriented polypropylene (BOPP)), polyethylene, polyurea, or polyester (e.g., polyethylene terephthalate), or release liner (e.g., siliconized liner). The liner can have a microstructure on its surface that is imparted to the adhesive to form a microstructure on the surface of the adhesive layer. The liner can then be removed to expose an adhesive layer having a microstructured surface.

Thus, adhesives according to the present disclosure can be utilized to form tape, for example. To form a tape, the adhesive is coated onto at least a portion of a suitable backing. A release material (e.g., low adhesion backsize) can be applied to the opposite side of the backing, if desired. When double-sided tapes are formed, the adhesive is coated onto at least a portion of both sides of the backing.

The adhesive can be formed into a film or coating by either continuous or batch processes. An example of a batch process is the placement of a portion of the adhesive between a substrate to which the film or coating is to be adhered and a surface capable of releasing the adhesive film or coating to form a composite structure. The composite structure can then be compressed at a sufficient temperature and pressure to form an adhesive coating or film of a desired thickness after cooling. Alternatively, the adhesive can be compressed between two release surfaces and cooled to form an adhesive transfer tape useful in laminating applications. If it is desired to have a microstructured surface on one or both surfaces of the adhesive layer, the adhesive coating or layer may be placed on a tool or a liner containing microstructuring. The liner or tool can then be removed to expose an adhesive layer having a microstructured surface.

Continuous forming methods include drawing the adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable pre-formed substrate. Using this method, the adhesive is applied to the moving pre-formed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Among the adhesive articles of interest are medical adhesive articles. Many conventional classes of pressure sensitive adhesives are not suitable or are problematic in medical adhesive articles. For example, natural rubber based pressure sensitive adhesives are undesirable because they can cause allergic reactions. Additionally some classes of pressure sensitive adhesives, such as (meth)acrylates, frequently contain residual (i.e., unreacted) monomers and other low molecular weight impurities in the final adhesive compositions. Residual monomers and low molecular weight impurities may cause, for example, undesirable odor or potential contamination of substrates/articles in which they are in contact.

Medical adhesive articles include articles with at least one substrate and an adhesive composition. During use, the adhesive composition is temporarily bonded to (e.g. human) skin. The pressure sensitive adhesives prepared from the packaged viscoelastic polyurea copolymers are useful in many medical applications such as tapes, bandages, dressings, drapes, athletic tapes, tapes and tabs used in adhering a medical device such as a sensor, electrode, and an ostomy appliance, as well as transdermal drug delivery devices. Additionally, the adhesive may be employed on protective and decorative face masks.

In general the medical adhesive articles contain a continuous or discontinuous coating of the pressure sensitive adhesive on at least one major surface of a backing. The backing may include one or more layers and may be in a variety of forms (e.g., foams or films). Examples of suitable backings include materials with a relatively low content of hydrophilic components such as polyester (e.g., commercially available under the designation HYTREL such as HYTREL 4056, from DuPont Co.), polyurethane (e.g., commercially available under the designation ESTANE, such as ESTANE 58309 and ESTANE 58237, from B. F. Goodrich Co.), polyether block amide (e.g., commercially available under the designation PEBAX, such as PEBAX 2533 and 3533, from Atochem Co.), and porous polyethylene resins. Also suitable are materials having relatively high moisture vapor transmission properties. Examples include certain polyether amides such as PEBAX 4011RNOO (Atochem Co.), and polyurethanes as described in U.S. Pat. No. 4,598,004 (Heinecke). Both classes of materials may also be used in combination with each other (e.g., in sandwich-type arrangements) to tailor the moisture vapor transmission properties of the dressing. Examples of specific dressing configurations for which the compositions are suitable are described in U.S. Pat. No. 4,952,618 (Olsen). Suitable materials for flexible substrates include paper, latex saturated paper, polymeric film, metallic foil, and ceramic sheeting. Appropriate materials for polymeric films include cellulose acetate film, ethyl cellulose film, polyolefins (such as polyethylene and polypropylene, including isotactic polypropylene), polystyrene, polyvinyl alcohol, polyester (e.g., poly(ethylene terephthalate) or poly(butylene terephthalate)), poly(caprolactam), poly(vinylidene fluoride), and the like. Suitable substrates also include commercially available fabrics such as non-woven, woven or knitted fabrics. Such fabrics may be constructed from a wide range of synthetic or natural fibers, used singly or in blends. Examples of suitable non-woven fabrics include carded, spun-bonded, spun-laced, air-laid, blown microfibrous constructions, and stitch-bonded fabrics. Suitable commercially available substrate materials include kraft paper (available from Monadnock Paper, Inc.); cellophane (available from Flexel Corp.); spun-bond poly(ethylene) and polypropylene, such as TYVEK. and TYPAR. (available from DuPont, Inc.); and porous films obtained from polyethylene and poly(propylene), such as TESLIN. (available from PPG Industries, Inc.), and CELLGUARD. (available from Hoechst-Celanese).

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| 33K PDMS diamine | A polydimethylsiloxane diamine with an average molecular weight of about 33,000 g/mole that was prepared as described in U.S. Pat. No. 5,214,119. |
| H12MDI | Methylene-bis-4-cyclohexyl isocyanate, (Desmondur W) from Bayer |

-continued

Table of Abbreviations

| Abbreviation or Trade Designation | Description |
|---|---|
| MQ Resin SR1000 | Silicate Tackifing Resin from GE Silicones |
| RHODORSIL 47V | A Polydimethylsiloxane fluid with tri methyl termination commercially available from Rhodia Silicones |
| EVA film | EVA film 63.5 micrometers (2.5 mils) thick from CT films |
| Backing A | A rayon nonwoven backing, such backing is present on medical tape commercially available from 3M Company, St. Paul, MN under the trade designation "MICROPORE" |
| Backing B | A 25 micrometer thick film of ESTANE 58237 thermoplastic polyurethane from Lubrizol Corporation, Wickliffe, Ohio. |
| Dressing-1 | Commercially available transparent medical dressing available under the name "TEGADERM" from 3M Company, Saint Paul, MN. |

Test Methods

Skin Adhesion Procedure

A prescribed test panel of individuals was selected to embrace the normal variations in skin surface that are encountered in medical practice.

The initial skin adhesion (TO) to dry or wet skin was measured and the skin adhesion value after 48 hours contact with the skin (T48) were determined using a slightly modified PSTC-1 procedure. PSTC-1 is test method No. 1 of the Pressure Sensitive Tape Council, Glenview, Ill., Seventh Edition (1976) which is hereby incorporated by reference, developed by the Specifications and Technical Committee of the Council. The test has been modified only to the extent that the tape was applied to the human skin surface on a selected area on the individual's back. The steps in the procedure are as follows:

1. Tape samples, 2.54 cm×5.09 cm, were placed on the back of the human subject.
2. Each tape was rolled down with one forward and one reverse pass, using a 1 kilogram tape roller (described in Appendix B, Sections 2.7.1, 2.8.1 and 2.8.2 of Pressure Sensitive Tape Council which is hereby incorporated by reference) moved at the rate of about 30 cm per minute.
3. Adhesion to the skin was measured as the peel force required to remove the tape at 180° angle (PSTC-1). The peel force values were measured through the use of a strain-gauge mounted on a motor-driven carriage. The force of removal was reported in grams of adhesion per 2.54 cm of width of sample. The rate of removal was 15 cm per minute.
4. The adhesion to skin was measured immediately after initial application (T0) wet and dry as well as after 48 hours of continuous contact with the skin (T48).

Example 1

A mixture of 51.02 grams of H12MDI in 9,595 grams of RHODORSIL 47V was mixed. This was placed into the pump tank of a Zenith gear pump. Into the pump tank of a second Zenith gear pump was placed 6,432 grams of 33K PDMS Diamine. The first pump was run at a rate of 106 grams/minute and the second pump was run at a rate of 70 grams/minute. The two pump streams were forced through a 6 inch (152 millimeter) static mixer where the streams from the two pumps were mixed before being fed into a pouch formed by two sheets of EVA Film that was driven at 6.5 feet (1.98 meters) per minute. The EVA sheet was heat sealed on the lateral edges and the bottom to form a rectangular pouch measuring 3.175 cm (1.25 inches) wide, on a liquid form-fill-seal machine. The pouch was filled with the 33K PDMS and the V-47/H12MDI mixture to a weight of 19 grams. The filled package was then heat sealed at the top in the cross direction through the mixture to form individual pouches measuring 3.175 cm by 3.175 cm by about 0.356 cm thick containing 19 grams of pre-viscoelastic composition. The polymerization to create the polydiorganosiloxane polyurea in silicone fluid mixture was completed in 2 minutes or less inside the pouch. The clear and firm pouches weighing 19 grams each were collected for a total of 13.60 kilograms.

Examples 2-9 and Comparative Example C1

Pouches containing the polydiorganosiloxane polyurea/RHODORSIL 47V mixture of Example 1 were fed into a Berstorff 25 mm Twin Screw extruder that was heated to 250° F. (121° C.) in all zones and a Haake melt pump that was also set to 250° F. (121° C.). MQ Resin SR1000 was fed with a K-tron gravimetric feeder in the first zone. The Pouches made in Example 1 were fed in the third zone. RHODORSIL V-47 was fed in zone 4. The weight % of the three feeds for each example is show in Table 1 below. The resulting molten PSA composition was passed through the melt pump that fed a contact die with a rotating rod to the coat weight shown in Table 1 below. The molten PSA was coated onto two types of backings (Backing A or Backing B) at a thickness of 23 micrometers (0.89 mil) and a silicone release liner was placed on the PSA surface to permit winding up of the samples.

TABLE 1

| Example Number | PSA coat weight (g/m²) | Backing used | % by weight Polydiorganosiloxane polyurea | % by weight RHODORSIL V-47 | % by weight MQ Resin SR1000 |
|---|---|---|---|---|---|
| 2 | 52 | Backing A | 10 | 40 | 50 |
| 3 | 26 | Backing B | 10 | 40 | 50 |
| 4 | 52 | Backing A | 11.43 | 40.95 | 47.62 |

TABLE 1-continued

| Example Number | PSA coat weight (g/m²) | Backing used | % by weight Polydiorganosiloxane polyurea | % by weight RHODORSIL V-47 | % by weight MQ Resin SR1000 |
|---|---|---|---|---|---|
| 5 | 26 | Backing B | 11.43 | 40.95 | 47.62 |
| 6 | 52 | Backing A | 12.73 | 41.82 | 45.45 |
| 7 | 26 | Backing B | 12.73 | 41.82 | 45.45 |
| 8 | 52 | Backing A | 13.91 | 42.61 | 43.48 |
| 9 | 26 | Backing B | 13.91 | 42.61 | 43.48 |

The tape samples created in Examples 2-9 were tested before and after exposure to Gamma sterilization for adhesion to skin using the Skin Adhesion Test Method listed above. The results are shown in Table 2 below. For Comparative Example C 1, Dressing-1 was used.

TABLE 2

| Example Number | Gamma Sterilized | T0-Dry | T0-Wet | T48 |
|---|---|---|---|---|
| 8 | No | 33 | 34 | 8 |
| 8 | Yes | 24 | 32 | 15 |
| 9 | No | 108 | 61 | 47 |
| 6 | No | 53 | 61 | 47 |
| 6 | Yes | 35 | 41 | 17 |
| 7 | No | 78 | 38 | 30 |
| C1 | Yes | 87 | 46 | 130 |

What is claimed is:

1. A method of forming a packaged viscoelastic composition comprising the steps of:
   forming a pre-viscoelastic reactive mixture comprising:
      combining reactive compounds comprising at least one polyisocyanate and at least one polyamine, wherein at least one of the reactive compounds is diluted with a diluent; and
      allowing a portion of the reactive compounds to react to form a pre-viscoelastic reactive mixture;
   combining the pre-viscoelastic reactive mixture and a packaging material to form a packaged pre-viscoelastic composition;
   and reacting the pre-viscoelastic reactive mixture to form a packaged viscoelastic composition, wherein at least a portion of the reactive compounds react in the packaging material, wherein the reaction of the pre-viscoelastic reactive mixture free of any catalyst forms the packaged viscoelastic composition in 15 minutes or less; and
   wherein the packaging material melts at or below the processing temperature of the viscoelastic composition.

2. A method according to claim 1 wherein the diluent comprises a silicone oil.

3. A method according to claim 1 wherein the pre-viscoelastic reactive mixture further comprises a tackifying resin.

4. A method according to claim 1 wherein the pre-viscoelastic reactive mixture further comprises a second polyamine.

5. A method according to claim 1 wherein the polyamine comprises a polydiorganosiloxane polyamine.

6. A method of claim 1, wherein the at least one polyisocyanate is diluted with a diluent.

7. A method of forming a coated adhesive article comprising:
   preparing a packaged hot melt processable adhesive composition comprising:
      combining reactive compounds comprising at least one polyisocyanate and at least one polyamine, wherein at least one of the reactive compounds is diluted with a diluent;
      allowing a portion of the reactive compounds to react to form a pre-viscoelastic reactive mixture;
      combining the pre-viscoelastic reactive mixture and a packaging material to form a packaged pre-viscoelastic composition; and
      further reacting the reactive compounds in the packaging material to form a packaged hot melt processable adhesive composition, wherein the reactive compounds react completely in 15 minutes or less;
   melting the packaged hot melt processable adhesive composition; and
   coating the hot melt processable adhesive composition onto a substrate.

8. A method according to claim 7 wherein hot melt processable adhesive is a pressure sensitive adhesive.

9. A method according to claim 7 wherein the reaction product further comprises a second polyamine.

10. A method according to claim 7 wherein preparing further comprises adding a tackifying resin.

11. A method according to claim 7 wherein the polyamine comprises a polydiorganosiloxane polyamine.

12. A method according to claim 7 wherein the hot melt adhesive composition further comprises a silicone oil.

13. A method according to claim 7 wherein the substrate comprises a paper, a film, a tape backing, a nonwoven, a release liner or a formed article.

14. The method of claim 7, wherein combining reactive compounds comprising at least one polyisocyanate and at least one polyamine occurs in a static mixer.

15. A method of forming a packaged viscoelastic composition comprising the steps of:
   providing a pre-viscoelastic reactive mixture, wherein the pre-viscoelastic reactive mixture is formed in a static mixer by combining reactants comprising at least one polyisocyanate and at least one polyamine, and allowing a portion of the reactive compounds to react to form a pre-viscoelastic reactive mixture;
   substantially surrounding the reactive pre-viscoelastic mixture with a packaging material;
   and allowing a portion of the pre-viscoelastic mixture to react within the packaging material to form a packaged viscoelastic composition, wherein the reaction of the pre-viscoelastic reactive mixture free of any catalyst forms the packaged viscoelastic composition in 15 minutes or less.

16. A method according to claim 15 wherein at least one of the reactants is diluted with a diluent.

17. A method of claim 16, wherein the at least one polyisocyanate is diluted with a diluent.

18. A method according to claim 15 wherein the pre-viscoelastic reactive mixture further comprises a tackifying resin.

19. A method according to claim 15 wherein the pre-viscoelastic reactive mixture further comprises a second polyamine.

20. A method according to claim 15 wherein the polyamine comprises a polydiorganosiloxane polyamine.

21. A method of forming a packaged viscoelastic polyurea composition comprising:
   forming a pre-viscoelastic reactive mixture in a static mixer by combining reactive compounds comprising at least one polyisocyanate and at least one polyamine, and allowing the reactive compounds to react spontaneously upon combining; wherein at least one of the reactive compounds is diluted with a diluent;
   transferring the pre-viscoelastic reactive mixture prior to complete reaction of the reactive compounds to a packaging material to form a packaged pre-viscoelastic composition; and
   allowing the reactive compounds to further react in the packaging material to form a packaged viscoelastic polyurea composition;
   wherein the reactive compounds react completely within 15 minutes or less.

22. A method of forming a coated adhesive article comprising:
   preparing a packaged hot melt processable adhesive composition comprising:
      combining reactive compounds comprising at least one polyisocyanate and at least one polyamine, wherein at least one of the reactive compounds is diluted with a diluent;
      allowing a portion of the reactive compounds to react to form a pre-viscoelastic reactive mixture;
      combining the pre-viscoelastic reactive mixture and a packaging material to form a packaged pre-viscoelastic composition; and
      further reacting the reactive compounds in the packaging material to form a packaged hot melt processable adhesive composition, wherein the reactive compounds react completely in 1 hour or less;
   melting the packaged hot melt processable adhesive composition; and
   coating the hot melt processable adhesive composition onto a substrate.

23. A method of forming a coated adhesive article comprising:
   preparing a packaged adhesive composition comprising:
      combining reactive compounds comprising at least one polyisocyanate and at least one polyamine, wherein at least one of the reactive compounds is diluted with a diluent;
      allowing a portion of the reactive compounds to react to form a pre-viscoelastic reactive mixture;
      combining the pre-viscoelastic reactive mixture and a packaging material to form a packaged pre-viscoelastic composition; and
      further reacting the reactive compounds in the packaging material to form a packaged adhesive composition, wherein the reactive compounds react completely in 1 hour or less; and
   coating the adhesive composition onto a substrate.

24. The method of claim 23 wherein the reactive compounds react completely in 15 minutes or less.

25. The method of claim 23 wherein coating the adhesive composition onto a substrate comprises removing the adhesive composition from the packaged adhesive composition with a solvent and coating the adhesive composition and solvent onto a substrate.

26. The method of claim 25 wherein coating the adhesive composition onto a substrate comprises dissolving or suspending the packaged adhesive composition in a solvent that dissolves the packaging material and coating the adhesive composition onto a substrate.

27. A method of forming a coated adhesive article free from solvents, the method comprising:
   preparing a packaged adhesive composition comprising:
      combining reactive compounds comprising at least one polyisocyanate and at least one polyamine, wherein at least one of the reactive compounds is diluted with a diluent;
      allowing a portion of the reactive compounds to react to form a pre-viscoelastic reactive mixture;
      combining the pre-viscoelastic reactive mixture and a packaging material to form a packaged pre-viscoelastic composition; and
      further reacting the reactive compounds in the packaging material to form a packaged adhesive composition;
      wherein the packaged adhesive composition is free from solvents; and
   coating the adhesive composition onto a substrate.

28. The method of claim 27 wherein the reactive compounds react in 15 minutes or less.

29. The method of claim 28 wherein coating the adhesive composition onto a substrate comprises removing the adhesive composition from the packaged adhesive composition with a solvent and coating the adhesive composition and solvent onto a substrate.

30. The method of claim 28 wherein coating the adhesive composition onto a substrate comprises dissolving or suspending the packaged adhesive composition in a solvent that dissolves the packaging material and coating the adhesive composition onto a substrate.

31. A method of forming a packaged viscoelastic composition, the method comprising:
   combining reactants comprising at least one polyisocyanate and at least one polyamine, and allowing the reactive compounds to react spontaneously to form a pre-viscoelastic reactive mixture;
   substantially surrounding the reactive pre-viscoelastic mixture with a packaging material;
   and allowing a portion of the pre-viscoelastic mixture to react within the packaging material to form a packaged viscoelastic composition, wherein the reaction of the previscoelastic reactive mixture forms the packaged viscoelastic composition in 15 minutes or less.

32. The method of claim 31 wherein combining reactants comprises combining the reactants using a continuous mixing method.

* * * * *

UNITED STATES PATENT AND TRADEMARK OFFICE
CERTIFICATE OF CORRECTION

| | | |
|---|---|---|
| PATENT NO. | : 8,202,934 B2 | Page 1 of 1 |
| APPLICATION NO. | : 11/830943 | |
| DATED | : June 19, 2012 | |
| INVENTOR(S) | : Audrey A Sherman et al. | |

It is certified that error appears in the above-identified patent and that said Letters Patent is hereby corrected as shown below:

Title page,
Item [75], Inventors, Line 6, - Delete "Minneaplolis," and insert -- Minneapolis, --, therefor.

Column 8
Lines 3-4 - Delete "isocyantes" and insert -- isocyanates --, therefor.
Line 48 - Delete "polyphenylmethylsoloxane," and insert -- polyphenylmethylsiloxane, --, therefor.

Column 14
Line 7 (table) - Delete "Desmondur" and insert -- Desmodur --, therefor.

Column 15
Line 5 (table) - Delete "Tackifing" and insert -- Tackifying --, therefor.

Column 20
Line 56 - In Claim 31, delete "previscoelastic" and insert -- pre-viscoelastic --, therefor.

Signed and Sealed this
Twenty-seventh Day of November, 2012

David J. Kappos
*Director of the United States Patent and Trademark Office*